(12) United States Patent  
Liu

(10) Patent No.: US 12,264,703 B2  
(45) Date of Patent: Apr. 1, 2025

(54) LOCKING MECHANISM AND CHILD'S PRODUCT

(71) Applicant: GOODBABY CHILD PRODUCTS CO., LTD., Jiangsu (CN)

(72) Inventor: Ping Liu, Jiangsu (CN)

(73) Assignee: GOODBABY CHILD PRODUCTS CO., LTD., Jiangsu (CN)

(*) Notice: Subject to any disclaimer, the term of this patent is extended or adjusted under 35 U.S.C. 154(b) by 140 days.

(21) Appl. No.: 17/768,882

(22) PCT Filed: Dec. 24, 2019

(86) PCT No.: PCT/CN2019/127847  
§ 371 (c)(1),  
(2) Date: Apr. 14, 2022

(87) PCT Pub. No.: WO2021/077603  
PCT Pub. Date: Apr. 29, 2021

(65) Prior Publication Data  
US 2024/0090682 A1  Mar. 21, 2024

(30) Foreign Application Priority Data  
Oct. 23, 2019 (CN) .......................... 201911011614.9

(51) Int. Cl.  
*F16C 11/10* (2006.01)  
*A47D 13/06* (2006.01)

(52) U.S. Cl.  
CPC ............ *F16C 11/10* (2013.01); *A47D 13/061* (2013.01); *Y10T 403/32409* (2015.01); *Y10T 403/591* (2015.01); *Y10T 403/602* (2015.01)

(58) Field of Classification Search  
CPC ........... F16C 11/00; F16C 11/04; F16C 11/10; F16C 11/103; Y10T 403/32081;  
(Continued)

(56) References Cited

U.S. PATENT DOCUMENTS 4,365,908 A * 12/1982 Thiboutot ............... F16C 11/04  
403/328  
5,211,498 A * 5/1993 Huang ................. A47D 13/063  
5/99.1

(Continued)

FOREIGN PATENT DOCUMENTS

CN   201230749 Y   5/2009  
CN   201577896 U   9/2010  
(Continued)

OTHER PUBLICATIONS

International Search Report for PCT/CN2019/127847 issued Apr. 23, 2020.

*Primary Examiner* — Josh Skroupa  
*Assistant Examiner* — Kevin J Baynes  
(74) *Attorney, Agent, or Firm* — MUNCY, GEISSLER, OLDS & LOWE, P.C.

(57) ABSTRACT

A locking mechanism is provided, including a locking body, a first connection member, a second connection member, a locking block rotatably connected to the locking body, a first locking member and a second locking member disposed on the locking block, a first matching portion formed on the first connection member and matching the first locking member, and a second matching portion formed on the second connection member and matching the second locking member. When the first matching portion and the second matching portion are respectively locked with the first locking member and the second locking member, the locking block is fixed with respect to the locking body; when the first matching portion is separated from the first locking member or the second matching portion is separated from the second locking member, the locking block rotates with respect to the locking body. The locking structure avoids unilateral locking and is convenient.

17 Claims, 13 Drawing Sheets

(58) Field of Classification Search
CPC ..... Y10T 403/32114; Y10T 403/32188; Y10T 403/32254; Y10T 403/32262; Y10T 403/32271; Y10T 403/32409; Y10T 403/59; Y10T 403/591; Y10T 403/599; Y10T 403/60; Y10T 403/602; A47D 9/005; A47D 13/061

See application file for complete search history.

(56) References Cited

U.S. PATENT DOCUMENTS

| | | | | |
|---|---|---|---|---|
| 5,353,451 A | * | 10/1994 | Hsiung | A47D 13/063 5/98.1 |
| 5,474,404 A | * | 12/1995 | Chien | A47D 13/063 5/98.1 |
| 5,483,710 A | * | 1/1996 | Chan | A47D 13/063 16/326 |
| 5,530,977 A | * | 7/1996 | Wang | A47D 13/063 16/326 |
| 5,730,542 A | * | 3/1998 | Cheng | A47D 13/063 5/98.1 |
| 5,761,755 A | * | 6/1998 | Huang | A47D 13/063 5/98.1 |
| 5,781,944 A | * | 7/1998 | Huang | A47D 13/063 5/98.1 |
| 5,857,229 A | * | 1/1999 | Magnani, Jr. | A47D 13/063 5/98.1 |
| 5,906,014 A | * | 5/1999 | Zhuang | A47D 13/063 5/98.1 |
| 5,964,545 A | * | 10/1999 | Cheng | A47D 13/063 5/98.1 |
| 5,978,987 A | * | 11/1999 | Wang | A47D 13/063 5/99.1 |
| 5,988,928 A | * | 11/1999 | Cheng | A47D 13/063 5/99.1 |
| 6,202,229 B1 | * | 3/2001 | Cheng | A47D 13/063 5/98.1 |
| 6,363,550 B1 | * | 4/2002 | Wang | A47D 13/063 5/99.1 |
| 6,364,563 B1 | | 4/2002 | Cheng et al. | |
| 6,385,800 B1 | * | 5/2002 | Chen | A47D 13/063 5/98.1 |
| 6,634,039 B1 | * | 10/2003 | Cheng | A47D 13/063 5/99.1 |
| 6,729,791 B1 | * | 5/2004 | Chen | A47D 13/063 403/102 |
| 7,108,443 B2 | * | 9/2006 | Chen | A47D 13/063 5/99.1 |
| 7,284,288 B2 | * | 10/2007 | Cheng | A47D 13/063 5/98.1 |
| 7,380,311 B2 | * | 6/2008 | Chen | A47D 13/063 5/99.1 |
| 9,103,368 B2 | * | 8/2015 | Mendes | F16C 11/10 |
| 11,864,667 B1 | * | 1/2024 | Zhang | A47D 9/005 |
| 11,889,932 B2 | * | 2/2024 | Tan | A47D 13/061 |
| 2007/0186344 A1 | | 8/2007 | Cheng et al. | |
| 2009/0178195 A1 | | 7/2009 | Zheng | |
| 2013/0239382 A1 | * | 9/2013 | Cheng | A47D 7/002 403/33 |
| 2015/0282629 A1 | | 10/2015 | Lamke | |

FOREIGN PATENT DOCUMENTS

| | | | | |
|---|---|---|---|---|
| CN | 201840125 U | | 5/2011 | |
| CN | 204708383 U | | 10/2015 | |
| CN | 106510284 A | | 3/2017 | |
| CN | 206612450 U | | 11/2017 | |
| CN | 207100995 U | | 3/2018 | |
| CN | 208909488 U | * | 5/2019 | ............. A47D 9/005 |
| DE | 9113474 U1 | * | 2/1992 | ............. F16C 11/10 |
| GB | 2412846 A | | 10/2005 | |

\* cited by examiner

LOCKING MECHANISM AND CHILD'S PRODUCT

CROSS-REFERENCE TO RELATED APPLICATIONS

This application claims priority to PCT Application No. PCT/CN2019/127847, having a filing date of Dec. 24, 2019, which is based on CN 2019110116149, having a filing date of Oct. 23, 2019, the entire contents both of which are hereby incorporated by reference.

FIELD OF TECHNOLOGY

The following relates to the technical field of child products, and in particular to a locking mechanism and a child's product.

BACKGROUND

The locking mechanism in a travel bed in the conventional art (such as CN206612450U), comprises a joint seat, a first connection member and a second connection member respectively connected to two end portions of the joint seat, and two lock pins slidably arranged on the joint seat, the first connection member and the second connection member are both provided with a locking slot matching the lock pins to lock up, an unlocking button is slidably arranged on the joint seat, and an inclined slot is arranged on the unlocking button and a sliding slot is arranged on the joint seat, the lock pins are inserted in the inclined slot and the sliding slot at the same time, and the lock pins are driven to slide in the inclined slot and the sliding slot by the sliding of the unlocking button to achieve unlocking.

However, through use, it is found that in the conventional art, it often occurs that after pressing the unlocking button, both the first connection member and the second connection member cannot be separated from the lock pins, that is, only unilateral unlocking is achieved after pressing the unlocking button, so that when a user folds the travel bed, the travel bed cannot be folded, and the user needs to press the unlocking button again, or even press the unlocking button multiple times to unlock. Similarly, when locking, the problem of unilateral locking is also prone to occur, so that the travel bed cannot be in a stable unfolding state, which affects the use.

SUMMARY

An aspect relates to a locking mechanism and a child's product, which can avoid unilateral locking and unlocking.

To achieve the above aspect, the technical solution employed by the present disclosure is:

One aspect of the present disclosure provides a locking mechanism, the locking mechanism comprises a locking body, a first connection member and a second connection member rotatably connected to two ends of the locking body, respectively, and the locking mechanism further comprises a locking block rotatably connected to the locking body, a first locking member and a second locking member disposed on the locking block, a first matching portion that is formed on the first connection member and can match the first locking member, and a second matching portion that is formed on the second connection member and can match the second locking member; when the first matching portion matches the first locking member and the second matching portion matches the second locking member, the locking mechanism is in a locked state, and the locking block is fixed with respect to the locking body; when the first matching portion is separated from the first locking member and the second matching portion matches the second locking member, or the second matching portion is separated from the second locking member and the first matching portion matches the first locking member, or the first matching portion is separated from the first locking member and the second matching portion is separated from the second locking member, the locking mechanism is in an unlocked state, and the locking block can rotate with respect to the locking body.

Specifically, the locking block is rotatably connected to the locking body through a first rotating shaft.

According to an implementation, the locking mechanism further comprises a first sliding slot disposed on the locking block and a second sliding slot disposed on the locking block, the first locking member is slidably disposed within the first sliding slot, the second locking member is slidably disposed within the second sliding slot, the locking mechanism further comprises an elastic element causing the first locking member and the second locking member to have a tendency to move to a locked state; when the first locking member and the second locking member are not subjected to external force, the first locking member and the second locking member are locked with the first matching portion and the second matching portion under the action of the elastic force of the elastic element; when the first locking member and the second locking member are subjected to external force, the first locking member and the second locking member overcome the elastic force of the elastic element, and slide in the first sliding slot and the second sliding slot, respectively, so that the first locking member and the second locking member are separated from the first matching portion and the second matching portion, to realize the unlocking of the locking mechanism.

In an embodiment, the first sliding slot and the second sliding slot respectively extend in the left-right direction of the locking mechanism, the left-right direction used in this patent is not limited to the horizontal direction or a direction parallel to the extending direction of the first sliding slot and the second sliding slot, but refers to a direction generally extending in the left-right direction, it may extend horizontally, or may be inclined in an up-down direction, as long as it does not affect the sliding of the first locking member and the second locking member to separate from the first matching portion and the second matching portion.

According to another implementation, the locking block comprises a first part and a second part that are rotatably connected, the first locking member is fixedly or rotatably disposed on the first part, the second locking member is fixedly or rotatably disposed on the second part, the locking mechanism further comprises an elastic element causing the first locking member and the second locking member to have a tendency to move to a locked state; when the first locking member and the second locking member are not subjected to external force, the first part and the second part are away from each other under the action of the elastic force, so that the first locking member and the second locking member are locked with the first matching portion and the second matching portion respectively; when the first locking member and the second locking member are subjected to external force, the first locking member and the second locking member drive the first part and the second part to approach each other against the elastic force of the elastic element, so that the first locking member and the second locking member are separated from the first matching portion and the second matching portion, to realize the unlocking of the locking mechanism.

Specifically, the locking body, the first part and the second part are coaxially and rotatably connected.

In an embodiment, the first part has a first end face, the second part has a second end face that can be disposed against the first end face, so that when the first end face and the second end face are against each other, the first part and the second part can only relatively rotate toward one direction, but cannot rotate in the opposite direction, thereby increasing the stability of the locked state.

According to the above two implementation, the elastic element may be one integrally provided or two separately provided, and the elastic element may be a tension spring or a spring.

For example, for the first implementation mentioned above, when there is one elastic element and the elastic element is a tension spring, two end portions of the tension spring is respectively connected to the first locking member and the second locking member, at this moment, when in the locked state, the first locking member and the second locking member are close to each other under the action of the elastic force of the tension spring and are locked with the first matching portion and the second matching portion, and when unlocking, overcoming the elastic force of the tension spring causes the first locking member and the second locking member to be away from each other, so that the first locking member and the second locking member are separated from the first matching portion and the second matching portion to realize unlocking. In this implementation, to enable the first connection member and the second connection member to rotate downward with respect to each other without being interfered by the locking body and the first locking member and the second locking member, the first matching portion and the second matching portion may be disposed on upper end faces of the first connection member and the second connection member, and respectively have a long slot to allow the first locking member and the second locking member to be away from each other, the slots have a stop block that can hook the first locking member and the second locking member to avoid the separation of the first locking member and the second locking member from the first connection member and the second connection member when in the locked state.

When the elastic element is a compressed spring, two end portions of the compressed spring respectively press against the first locking member and the second locking member, and in the locked state, the first locking member and the second locking member are away from each other under the action of the elastic force of the compressed spring and are locked with the first matching portion and the second matching portion, and when unlocking, overcoming the elastic force of the compressed spring causes the first locking member and the second locking member to get close to each other, so that the first locking member and the second locking member are separated from the first matching portion and the second matching portion to realize unlocking. In this implementation, the first matching portion and the second matching portion may adopt recesses disposed on the end portions of the first connection member and the second connection member. This implementation is adopted, because comparing with the implementation of tension spring, this implementation is more convenient to provide and has a relatively simple structure.

For the second implementation mentioned above, when there is one elastic element and the elastic element is a tension spring, two end portions of the tension spring is respectively connected to the first part and the second part, at this moment, when in the locked state, the first locking member and the second locking member are close to each other under the action of the elastic force of the tension spring and are locked with the first matching portion and the second matching portion, and when unlocking, overcoming the elastic force of the tension spring causes the first part and the second part to be away from each other, so that the first locking member and the second locking member are away from each other to separate from the first matching portion and the second matching portion to realize unlocking. In this implementation, to enable the first connection member and the second connection member to rotate downward with respect to each other without being interfered by the locking body and the first locking member and the second locking member, the first matching portion and the second matching portion may be disposed on upper end faces of the first connection member and the second connection member, and respectively have a long slot to allow the first locking member and the second locking member to be away from each other, the slots have a stop block that can hook the first locking member and the second locking member to avoid the separation of the first locking member and the second locking member from the first connection member and the second connection member when in the locked state.

When the elastic element is a compressed spring, two end portions of the compressed spring respectively press against the first part and the second part, and in the locked state, the first part and the second part are away from each other under the action of the elastic force of the compressed spring, so that the first locking member and the second locking member are respectively locked with the first matching portion and the second matching portion, and when unlocking, overcoming the elastic force of the compressed spring causes the first part and the second part to get close to each other, so that the first locking member and the second locking member get close to each other and thus are separated from the first matching portion and the second matching portion to realize unlocking. In this implementation, the first matching portion and the second matching portion may adopt recesses disposed on the end portions of the first connection member and the second connection member. This implementation is adopted, because comparing with the implementation of tension spring, this implementation is more convenient to provide and has a relatively simple structure.

Specifically, the locking mechanism further comprises an unlocking member that can drive the locking mechanism to unlock, the unlocking member comprises an unlocking body slidably disposed on the locking body, a first unlocking portion that is disposed on the unlocking body and can drive the first locking member to separate from the first matching portion as the unlocking body slides, and a second unlocking portion that is disposed on the unlocking body and can drive the second locking member to separate from the second matching portion as the unlocking body slides.

Wherein, the first unlocking portion and the second unlocking portion are any component that can drive the first locking member and the second locking member to slide, such as a shift lever, etc., when a lever is adopted, the reset of the unlocking portions may adopt a reset member disposed separately, such as a reset spring and the like.

In an embodiment, the first unlocking portion and the second unlocking portion are respectively sliding slots disposed on the unlocking body and extending obliquely.

According to an implementation, namely the locking mechanism further comprises a first sliding slot disposed on the locking block and a second sliding slot disposed on the locking block, the first locking member is slidably disposed within the first sliding slot, and the second locking member is slidably disposed within the second sliding slot, in this solution, the extension directions of the first sliding slot and the first unlocking portion intersect, and the extension directions of the second sliding slot and the second unlocking portion intersect, the first locking member is simultaneously inserted into the first sliding slot and the first unlocking portion, and the second locking member is simultaneously inserted into the second sliding slot and the second unlocking portion, so that when the unlocking body slides, the first unlocking portion and the second unlocking portion can drive the first locking member and the second locking member to slide relative to the locking body to realize unlocking; when the first locking member and the second locking member move toward the locking direction, the first unlocking portion and the second unlocking portion can also drive the unlocking body to slide and reset, so that there is no need to additionally provide a reset member to reset the unlocking member.

Wherein, the sliding slots may be slots with a width larger than the diameter of the first locking member and the second locking member, so that when the locking mechanism is unilaterally locked, the sliding slots will not interfere with the swing of the locking block, however, in this way, when the unlocking member controls the locking mechanism to unlock, it needs a large distance to make the side walls of the sliding slots contact the locking member to drive the locking member to unlock, so that the volume of the locking mechanism is large, and therefore, the following implementation is adopted.

In an embodiment, when the locking mechanism is in the locked state, the first unlocking portion and the second unlocking portion are respectively arc-shaped slots with a point on the axial line of rotation of the locking block as the center of the circle, so that when the locking mechanism is unilaterally locked, the first locking member and the second locking member can slide freely in the first unlocking portion and the second unlocking portion with the swing of the locking block, in addition, the width of the arc-shaped slots is reduced as much as possible, as long as that the locking block can slide freely in the unlocking portions, so that during unlocking operation, the unlocking operation can be achieved by sliding the unlocking body a small distance.

According to another implementation, namely, the locking block comprises a first part and a second part that are rotatably connected, the first locking member is fixedly or rotatably disposed on the first part, and the second locking member is fixedly or rotatably disposed on the second part, in this solution, the arrangement of the first unlocking portion and the second unlocking portion needs to enable the locking block to rotate freely with respect to the locking body without being interfered by the unlocking member when unilaterally locking or unlocking, and during operating the unlocking member, the first unlocking portion and the second unlocking portion can drive the first locking member and the second locking member to move and then enables the first part and the second part to overcome the elastic force of the elastic element to rotate.

In an embodiment, the first unlocking portion has an outer side surface for providing force required to drive the first locking member to rotate about the first rotation shaft, and the second unlocking portion has an outer side surface for providing force required to drive the second locking member to rotate about the first rotation shaft.

According to a specific and preferred implementation, both the first unlocking portion and the second unlocking portion are provided with inclined surfaces that can push the first locking member and the second member toward the center.

In an embodiment, when the locking mechanism is in the locked state, an angle between the connecting line of the center of the first rotation shaft and the center of the first locking member and the extension line of the outer side surface of the first unlocking portion is greater than 90°, and an angle between the connecting line of the center of the first rotation shaft and the center of the second locking member and the extension line of the outer side surface of the second unlocking portion is greater than 90°.

In an embodiment, inner side surfaces of the first unlocking portion and the second unlocking portion are arc surfaces, the radian of the arc surfaces is consistent with the radian of rotation of the first locking member and the second locking member around the first rotation shaft.

Specifically, the unlocking member further comprise a third sliding slot disposed on the unlocking body and extending in an up-down direction, a sliding rod fixedly disposed on the locking body and inserted in the third sliding slot, and a fourth sliding slot disposed on the unlocking body for avoiding a connection shaft between the locking block and the locking body.

In an embodiment, the unlocking body comprises a first plate located below, and a second plate and a third plate that are respectively located in the front and rear and connected with the first plate, the locking block is located between the second plate and the third plate, and when the locking mechanism is in the locked state, the first plate is exposed outside the locking body, so that it is convenient for squeezing the unlocking body to move it upward to realize unlocking, and when unlocking, under the action of the gravity of the unlocking body, combined with the elastic force of the elastic element, it is more convenient for the locking mechanism to re-lock.

Another aspect of the present disclosure provides a child's product, which adopts the locking mechanism mentioned above.

Specifically, the child's product may be beds, strollers, or other child products that need to use this locking mechanism.

The orientation words such as left, right, up, down, front, rear, etc. involved herein are defined by the orientation of the child's bed when the child's bed is in the unfolded state when the locking mechanism is used for the connection and locking of the enclosure rods of the child's bed, that is, they are defined in the orientation of FIG. 1.

The scope of the present disclosure is not limited to technical solutions specifically combined by the above technical features, and should encompass other technical solutions formed by any combination of the above technical features or the equivalent features thereof. For example, the technical solutions are formed by substituting between the above technical features and, but not limited to, the technical features with similar functions disclosed by the present disclosure.

Due to the use of the above technical solutions, the present disclosure has the following advantages over the conventional art:

The locking mechanism of the present disclosure only can realize locking when both sides are locked at the same time, so that the problem of unilateral locking or unilateral unlocking of the locking structure in the conventional art can be avoided, and is convenient for a user to use.

BRIEF DESCRIPTION

Some of the embodiments will be described in detail, with references to the following Figures, wherein like designations denote like members, wherein.

LIST OF REFERENCE SIGNS 1, first rod; 2, second rod; 3, locking body; 4, second rotation shaft; 5, third rotation shaft; 6, first connection member; 61, first matching portion; 7, second connection member; 71, second matching portion; 8, first rotation shaft; 9, locking block; 91, locking block body; 92, locking block stop plate; 93, accommodating slot; 94, first sliding slot; 95, second sliding slot; 96, first part; 97, second part; 961, first end face; 971, second end face; 10, first locking member; 11, second locking member; 12, elastic element; 13, unlocking member; 131, first plate; 132, second plate; 133, third plate; 134, third sliding slot; 135, fourth sliding slot; 136, first unlocking portion; 137, second unlocking portion; 14, sliding rod.

DETAILED DESCRIPTION

In the following, the technical solution of the present disclosure is further described combining with the accompanying drawings and specific embodiments. The technical features in this patent may be combined with each other as long as they do not conflict with each other.

Embodiment 1

A locking mechanism as shown in FIG. 1 to FIG. 12 can be used in child's products to lock two components rotatably disposed with respect to each other, for example, the child's product may be beds, strollers, and the like.

Figure 1:
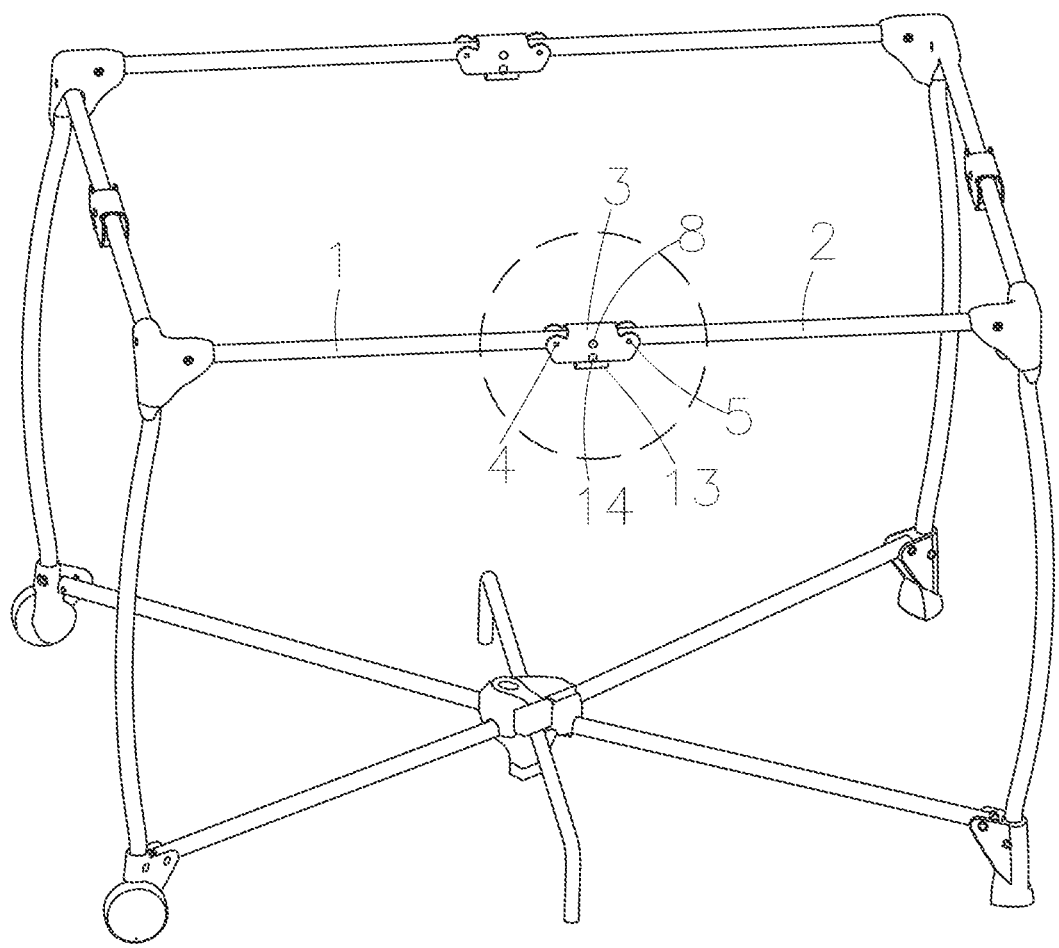
FIG. 1 is a solid diagram of a child's bed according to a specific embodiment of the present disclosure.
Figure 2:
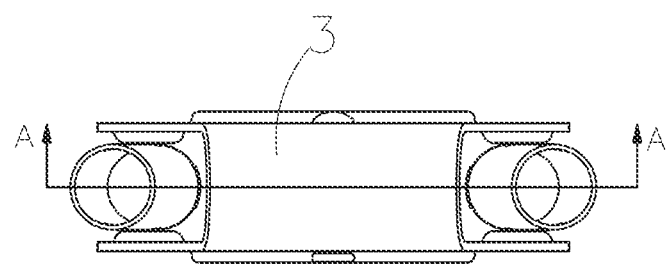
FIG. 2 is a partial enlarged plan view of FIG. 1.

As shown in FIG. 1, the locking mechanism is used in a child's bed, in particular, this locking mechanism is used in an enclosure rod; the enclosure rod comprises a first rod 1 and a second rod 2 that are rotatably disposed with respect to each other so that they can be folded and unfolded, and the locking mechanism locks the first rod 1 and the second rod 2 with respect to each other.

Figure 3:
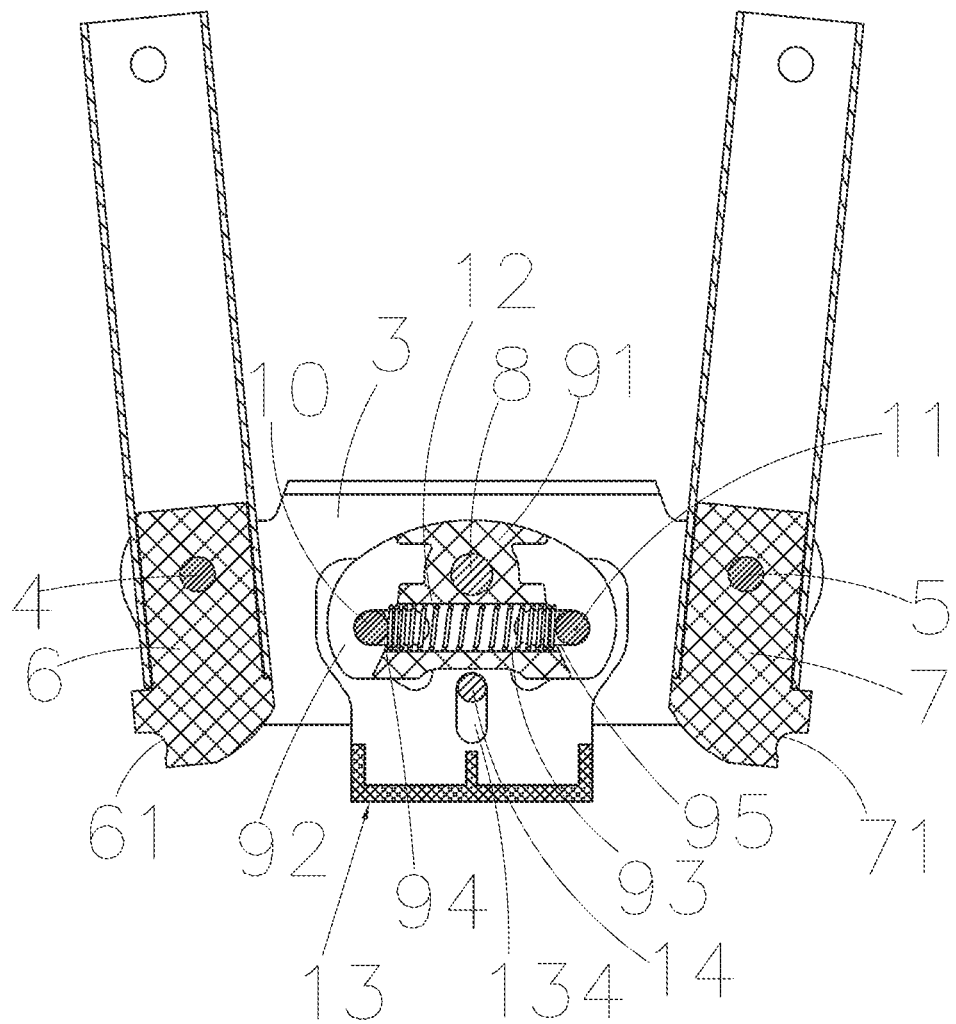
FIG. 3 is the A-A sectional view of Embodiment 1 of FIG. 2.

As shown in FIG. 3, the locking mechanism comprises a locking body 3, a first connection member 6 and a second connection member 7 rotatably connected to two ends of the locking body 3 through a second rotation shaft 4 and a third rotation shaft 5, respectively; wherein, the first connection member 6 and the second connection member 7 may be fixedly connected with the first rod 1 and the second rod 2 respectively; or the first connection member 6 and the first rod 1 are one rod or integrally provided, and the second connection member 7 and the second rod 2 are one rod or integrally provided.

Figure 4:
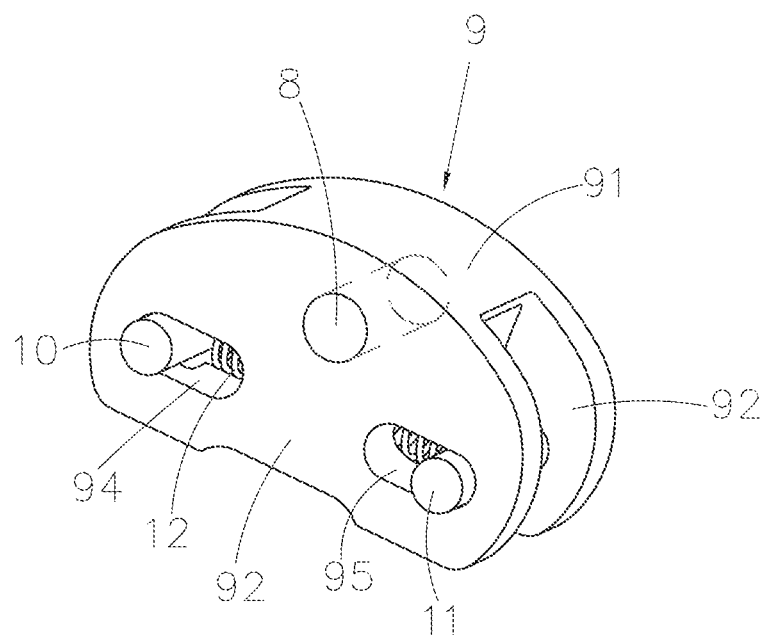
FIG. 4 is a solid diagram of the locking block of Embodiment 1.

As shown in FIG. 3 and FIG. 4, the locking mechanism further comprises a locking block 9 rotatably connected to the locking body 3 through a first rotation shaft 8; the locking block 9 is a whole which is fixed together or provided in one piece; the locking block 9 comprises a locking block body 91 rotatably connected to the locking body 3 through the first rotation shaft 8, locking block stop plates 92 fixedly connected with the front side and the rear side of the locking block body 91, respectively, and an accommodating slot 93 disposed on the locking block body 91 and extending in a left-right direction; wherein, there is an accommodating space between the two locking block stop plates 92, corresponding positions on the left and right sides of the two locking block stop plates 92 are respectively provided with a first sliding slot 94 and a second sliding slot 95, which extend along the left and right directions of the locking mechanism respectively.

A first locking member 10 is inserted into the first sliding slots 94 of the front and rear locking block stop plates 92 and can slide in the first sliding slots 94, and a second locking member 11 is inserted into the second sliding slots 95 of the front and rear locking block stop plates 92 and can slide in the second sliding slots 95.

An elastic element 12 is disposed within the accommodating slot 93 of the locking block 9 and two end portions thereof are respectively against the first locking member 10 and the second locking member 11, so that when the locking member 10 and the second locking member 11 are in the locked state, they are located outside the first sliding slots 94 and the second sliding slots 95 (the positions shown in FIG. 3).

A first matching portion 61 matching the first locking member 10 is formed on an end portion of the first connection member 6, and a second matching portion 71 matching the second locking member 11 is formed on an end portion of the second connection member 7; wherein the first matching portion 61 and the second matching portion 71 are respectively recesses. When the locking mechanism is in the locked state, the end portion of the first connection member 6 and the end portion of the second connection member 7 are respectively located within the accommodating space between the two locking block stop plates 92, the first matching portion 61 matches and is locked with the first locking member 10, the second matching portion 71 matches and is locked with the second locking member 11, at this moment, the locking block 9 and the locking body 3 are fixed with respect to each other, and the first connection member 6 and the second connection member 7 are fixed with respect to the locking body 3.

Figure 5:
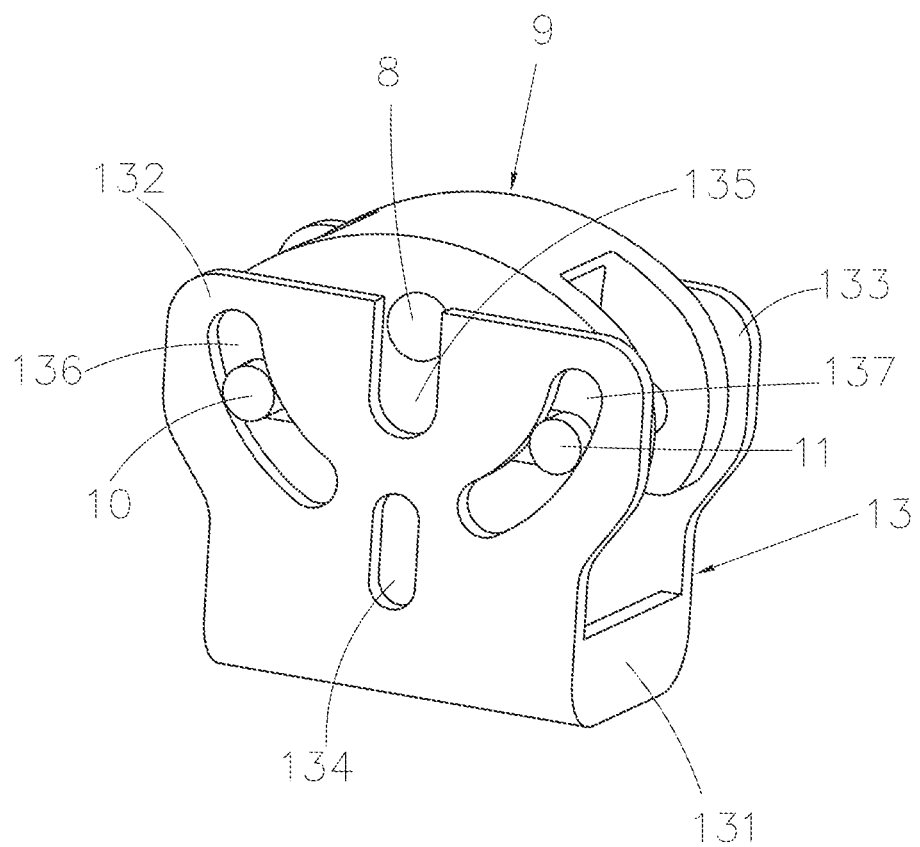
FIG. 5 is a solid diagram showing the matching of the locking block and the unlocking member of Embodiment 1.

As shown in FIG. 3 and FIG. 5, the locking mechanism further comprises an unlocking member 13 that can drive the locking mechanism to unlock, the unlocking member 13 comprises an unlocking body slidably disposed on the locking body 3; the unlocking body comprises a first plate 131 located below, and a second plate 132 and a third plate 133 that are respectively located in the front and rear and connected with the first plate 131; an accommodating space is formed between the second plate 132 and the third plate 133, the locking block 9 is located within the accommodating space formed between the second plate 132 and the third plate 133, and when the locking mechanism is in the locked state, the first plate 131 is exposed outside the locking body 3, so that it is convenient for squeezing the unlocking body to move it upward to realize unlocking.

Corresponding positions of the second plate 132 and the third plate 133 are respectively provided with third sliding slots 134 extending in the up-down direction, and a sliding rod 14 is fixedly disposed on the locking body 3 and inserted into the third sliding slots 134 on the second plate 132 and the third plate 133, so as to guide the sliding of the unlocking member 13 relative to the locking body 3.

Corresponding positions of the second plate 132 and the third plate 133 are respectively provided with fourth sliding slots 135, the first rotation shaft 8 passes through the fourth sliding slots 135 on the second plate 132 and the third plate 133, so that the rotation of the locking block 9 is not interfered by the unlocking member 13, and the upper portion of the fourth sliding slots 135 can be closed or communicated with the outside.

The locking block 9 is disposed above the sliding rod 14, the fourth sliding slots 135 are located above the third sliding slots 134, and when the locking mechanism is in the locked state, the sliding rod 14 is at the upper end portions of the third sliding slots 134, so that when operating the unlocking member 13, the unlocking body can slide upward without being interfered by the locking block 9.

Corresponding positions on the left and right sides of the second plate 132 and the third plate 133 are further provided with first unlocking portions 136 and second unlocking portions 137, respectively; the first unlocking portions 136 and the second unlocking portions 137 are arc-shaped slots with the same point as the center of the circle, and the width of the arc-shaped slots is slightly larger than the external diameter of the locking members, and when the locking mechanism is in the locked state, the center of the circle is located on the axial line of rotation of the locking block 9. The first locking member 10 is inserted into the first sliding slots 94 of the front and rear locking block stop plates 92 and the first unlocking portions 136 on the second plate 132 and the third plate 133, and the second locking member 11 is inserted into the second sliding slots 95 of the front and rear locking block stop plates 92 and the second unlocking portions 137 on the second plate 132 and the third plate 133.

Figure 9:
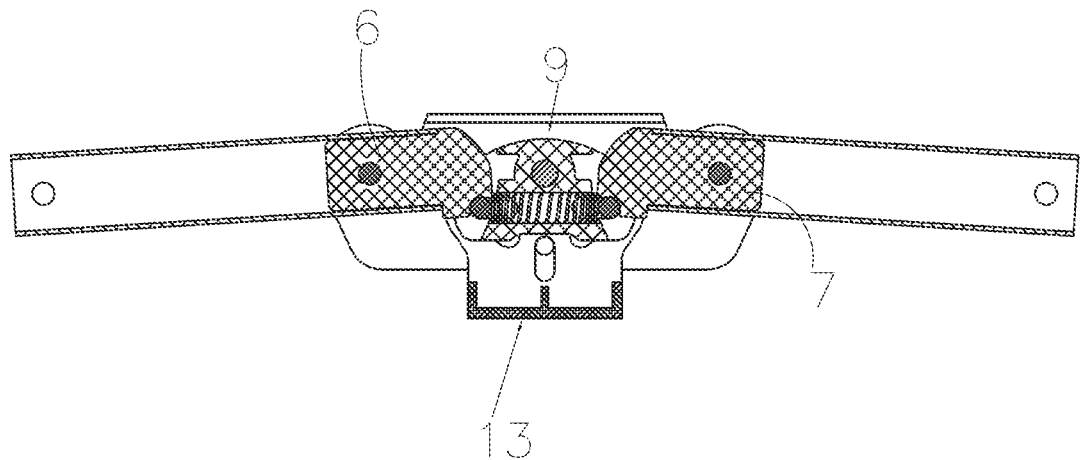
FIG. 9 is a sectional view of the locking mechanism of Embodiment 1 in the locked state.
Figure 10:
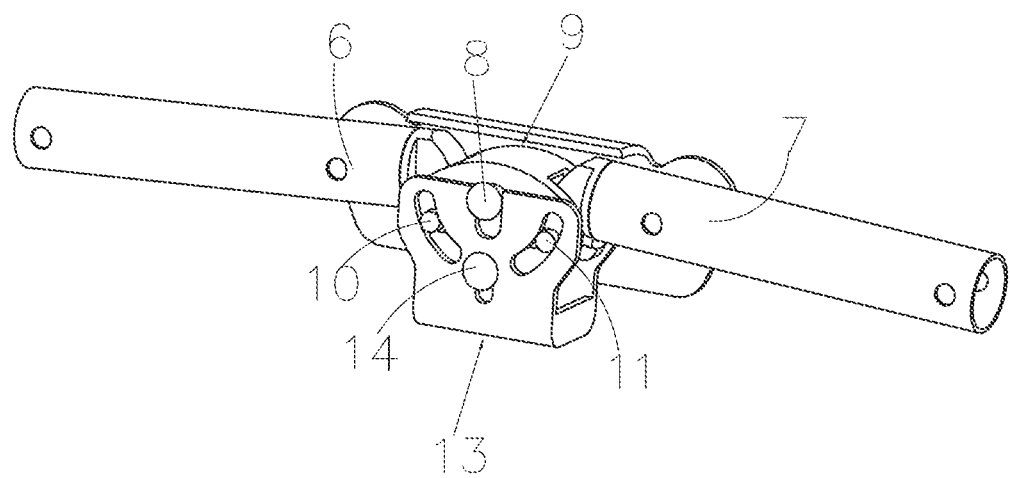
FIG. 10 is a solid diagram of the locking mechanism of Embodiment 1 in the locked state.
Figure 11:
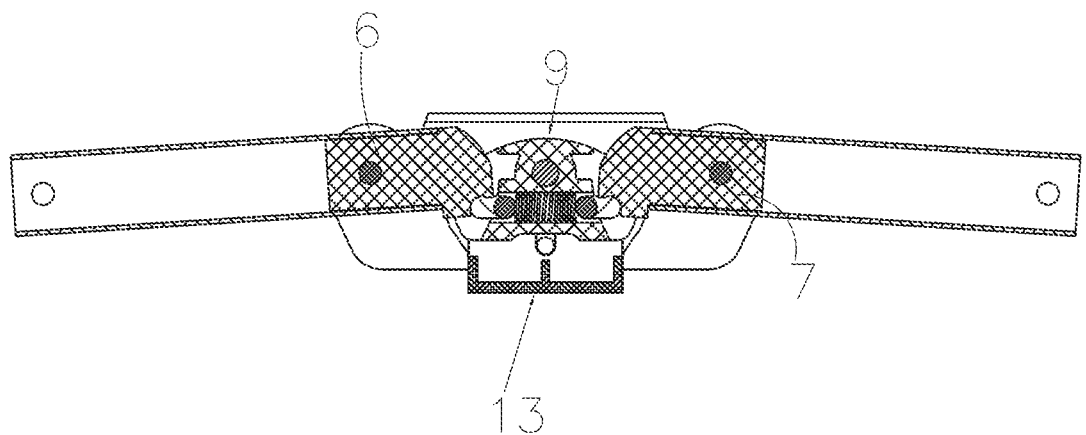
FIG. 11 is a sectional view showing the unlocking member controls the locking mechanism to unlock in Embodiment 1.
Figure 12:
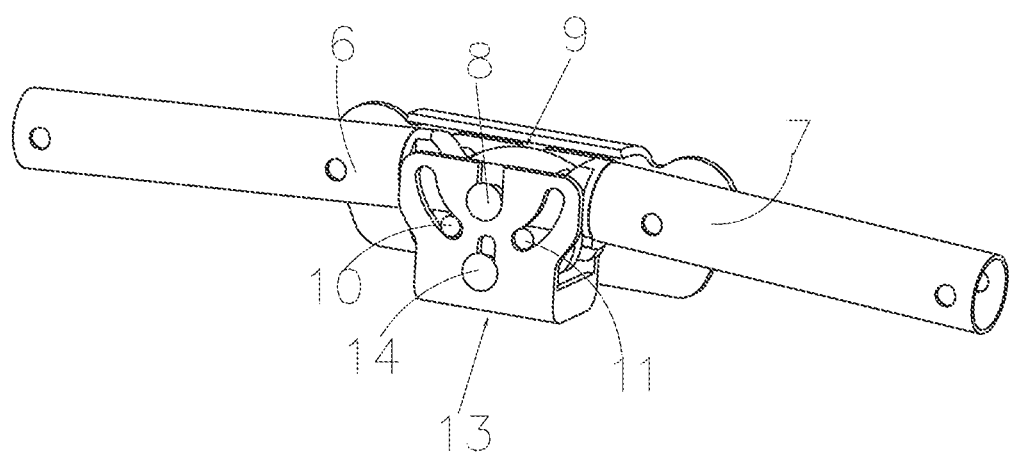
FIG. 12 is a solid diagram showing the unlocking member controls the locking mechanism to unlock in Embodiment 1.

As shown in FIG. 9 and FIG. 10, when the locking mechanism is in the locked state, at this moment, by squeezing the unlocking member 13 to slide it upward, the first unlocking portions 136 and the second unlocking portions 137 drive the first locking member 10 and the second locking member 11 to slide in the direction of proximity to each other within the first sliding slots 94 and the second sliding slots 95, the first locking member 10 is separated from the first matching portion 61, and the second locking member 11 is separated from the second matching portion 71, at this moment, the elastic element 12 is compressed (as shown in FIG. 11 and FIG. 12). The first connection member 6 and the second connection member 7 can respectively rotate around the second rotation shaft 4 and the third rotation shaft 5, the first locking member 10 and the second locking member 11 move within the first sliding slots 94 and the second sliding slots 95 in opposite directions under the action of the elastic force of the elastic element 12, the movement of the first locking member 10 and the second locking member 11 and the self-gravity of the unlocking member 13 drive the unlocking member 13 to slide downward to the unlocked state, as shown in FIG. 6.

Figure 6:
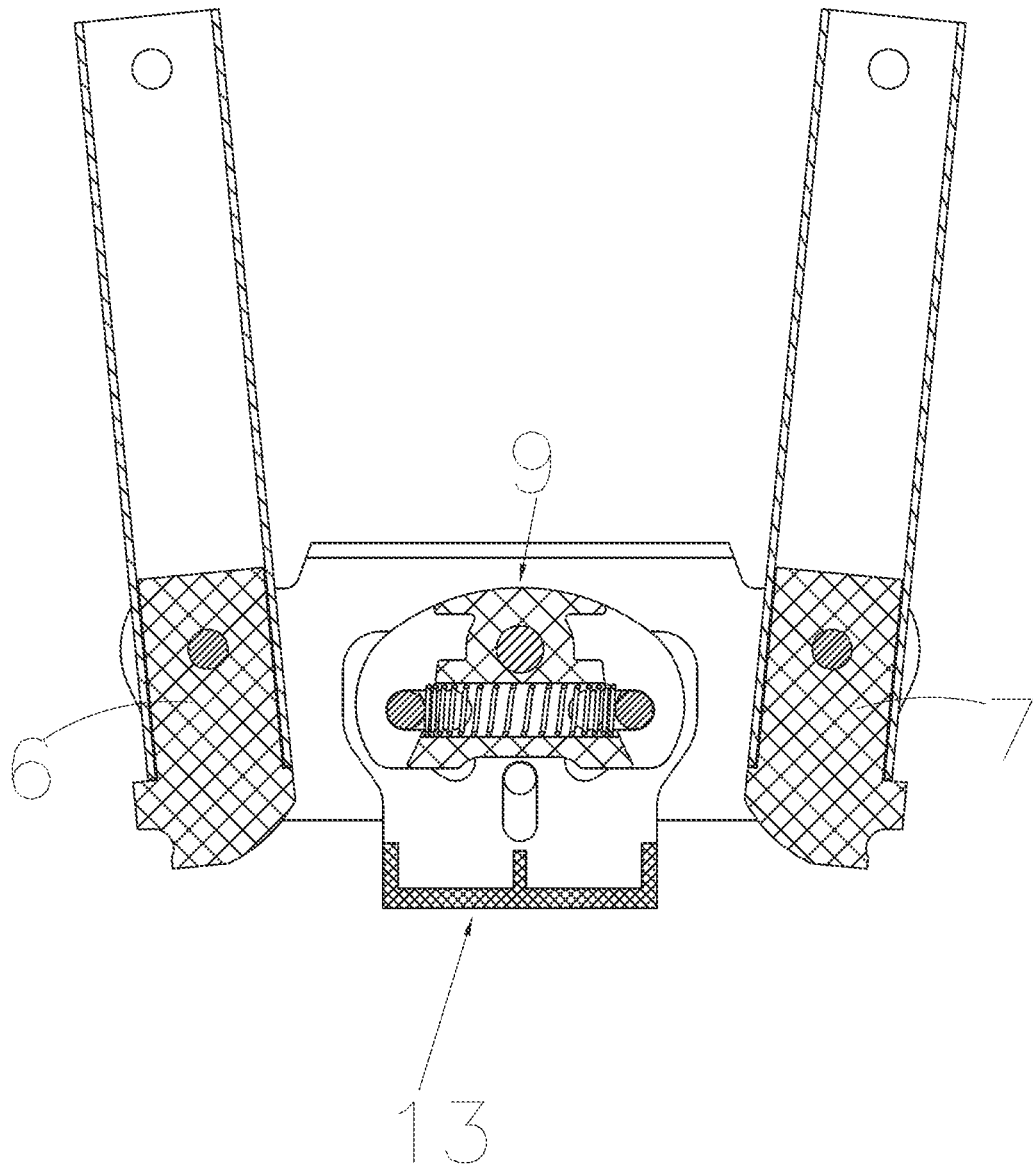
FIG. 6 is a sectional view of the locking mechanism of Embodiment 1 in the unlocked state.
Figure 7:
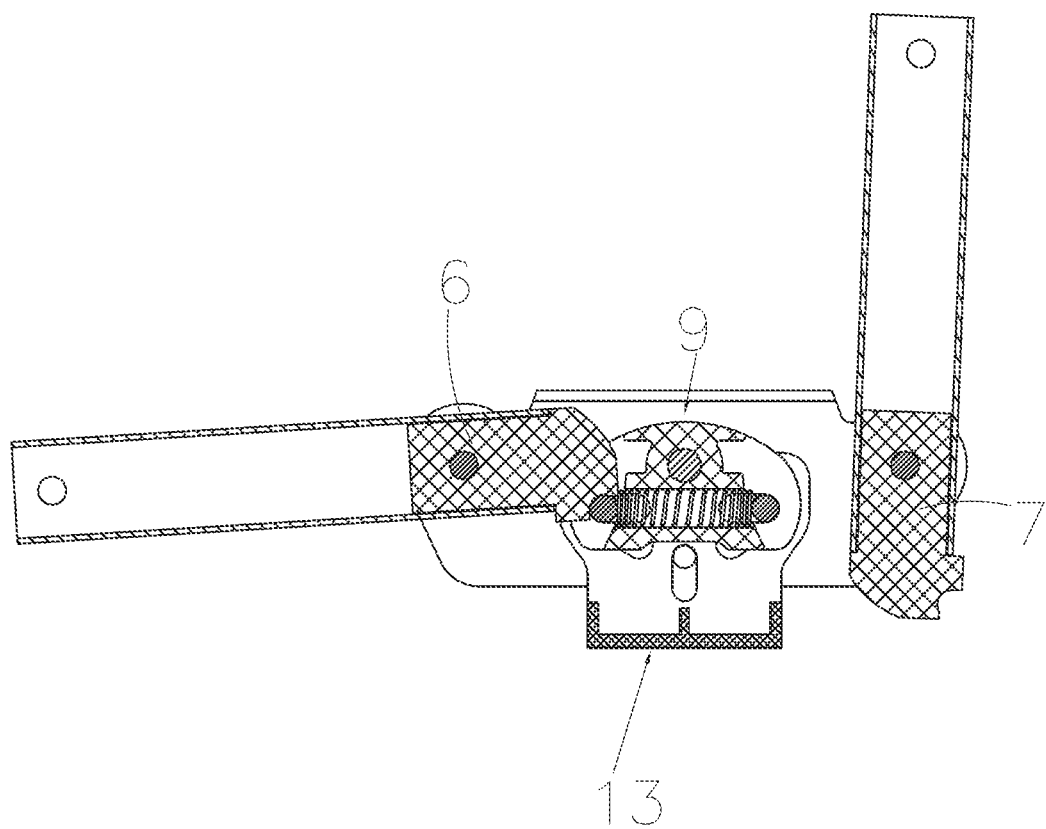
FIG. 7 is a sectional view of the locking mechanism of Embodiment 1 in a unilateral locked state.
Figure 8:
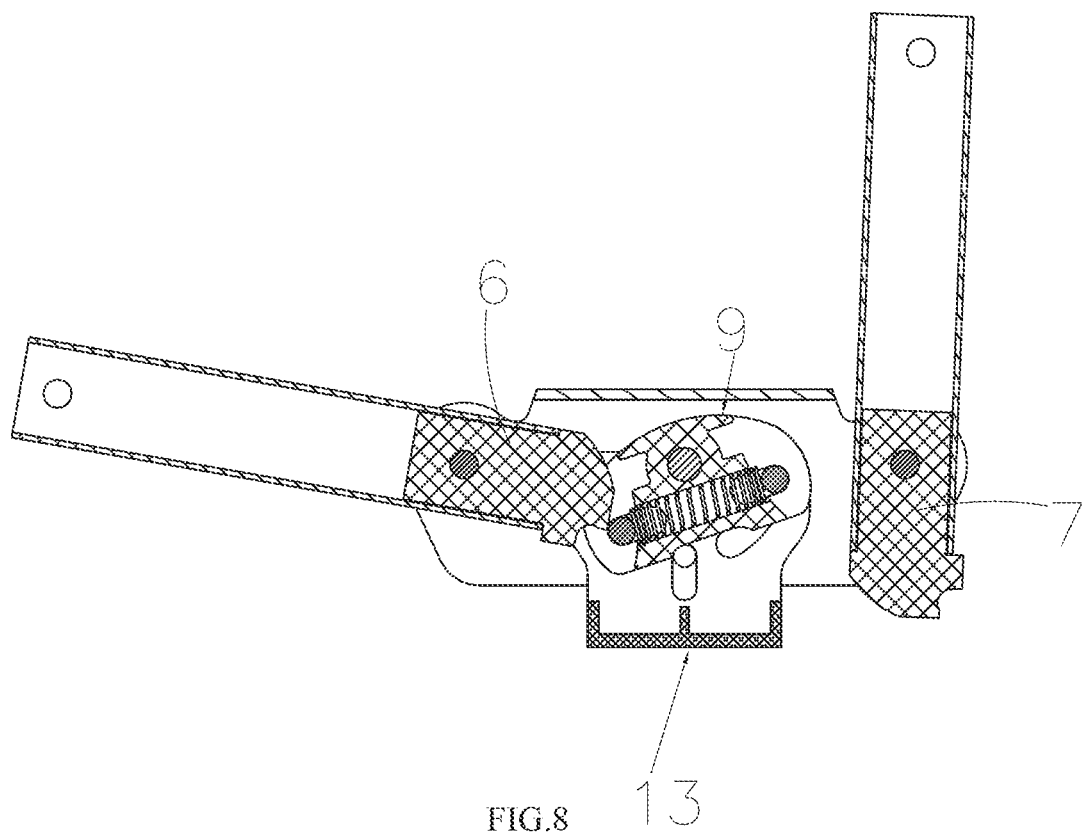
FIG. 8 is a sectional view of the swing of the locking block of Embodiment 1 when the locking mechanism is unilaterally locked.

As shown in FIG. 7, when the first matching portion 61 matches and is locked with the first locking member 10, and the second matching portion 71 is separated from the second locking member 11, the weight of the first connection member 6 will drive the first locking member 10 to move downward, thereby driving the locking block 9 to rotate around the first rotation shaft 8, as shown in FIG. 8, the first connection member 6 continues to rotate downward under the action of its own gravity until it is separated from the first locking member 10, and the locking block 9 returns to a balanced state under the action of its own gravity, as shown in FIG. 6, so that the locking mechanism cannot perform unilateral locking, and the locking mechanism can be locked only when both sides are locked at the same time.

Embodiment 2

The general structures of Embodiment 2 and Embodiment 1 are the same, the difference lies in the structure of the locking block 9, the connection method of the first locking member 10, the second locking member 11 and the locking block 9, and the shape of first unlocking portions 136 and the second unlocking portions 137.

The specific structures of the differences between Embodiment 2 and Embodiment 1 will be described in detail below, and for the other structures of Embodiment 2, refer to Embodiment 1, which will not be repeated here.

As shown in FIGS. 13 to 22, the locking block 9 comprises a first part 96 and a second part 97 that are rotatably connected, that is, the locking block 9 of Embodiment 1 is divided into left and right parts that are rotatably connected. The first part 96, the second part 97, and the locking body 3 are coaxially connected through the first rotation shaft 8. The first locking member 10 is fixedly or rotatably disposed on the first part 96, and the second locking member 11 is fixedly or rotatably disposed on the second part 97. The upper portion of the first part 96 has a first end face 961, and the upper portion of the second part 97 has a second end face 971 that can be disposed against the first end face 961. Two end portions of the elastic element 12 are respectively disposed against the first part 96 and the second part 97, so that the first locking member 10 and the second locking member 11 have a tendency to move to the locked state.

Figure 13:
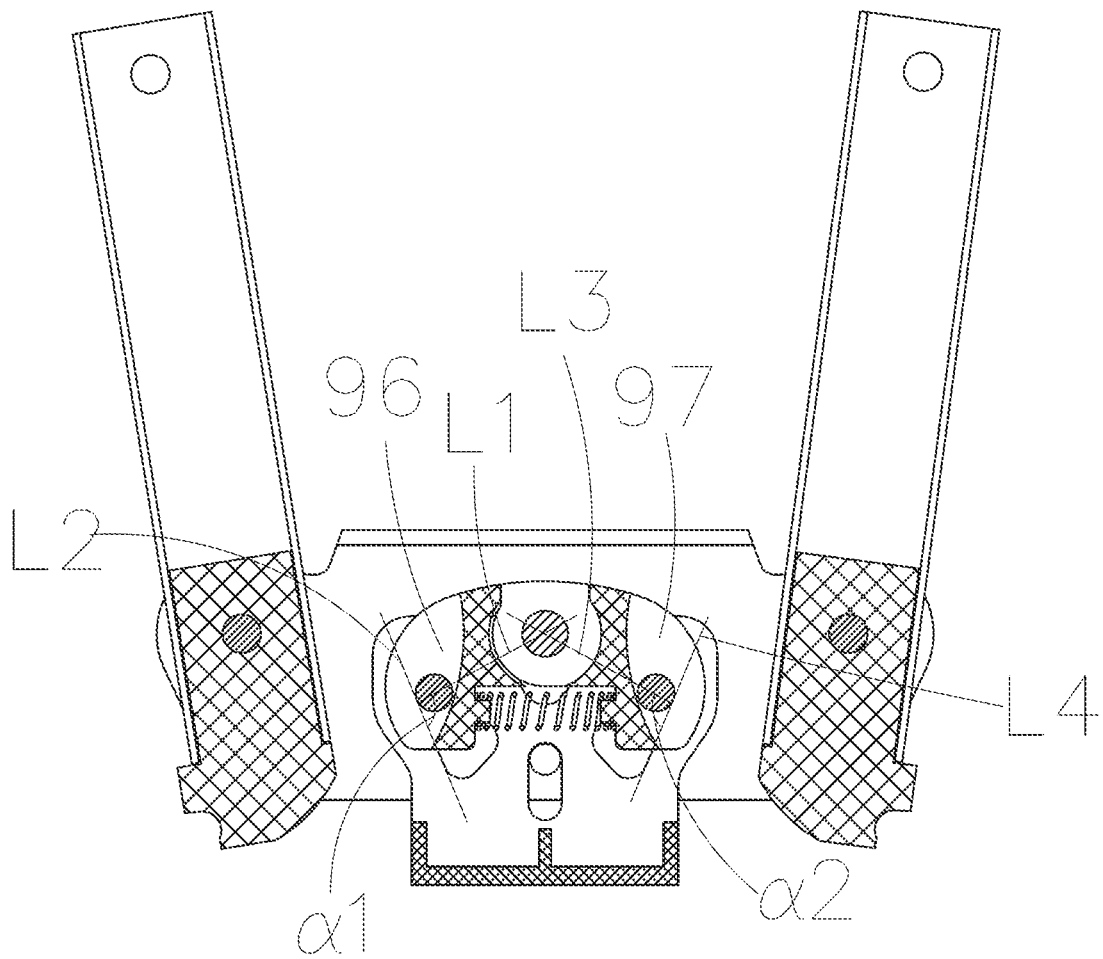
FIG. 13 is the A-A sectional view of Embodiment 2 of FIG. 2.
Figure 14:
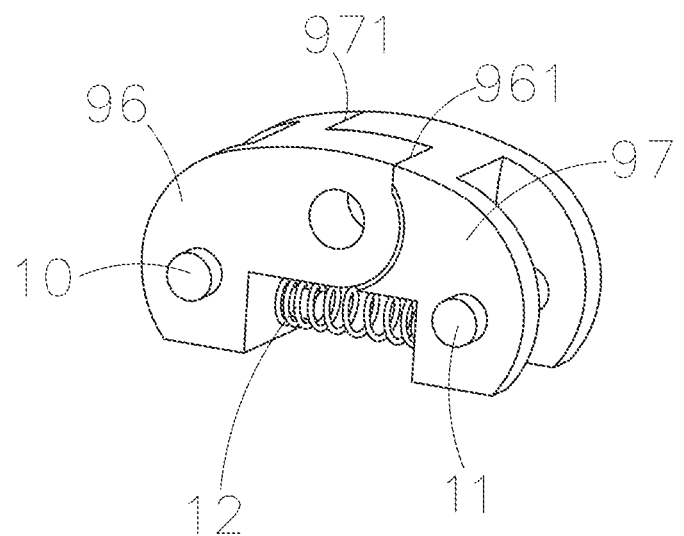
FIG. 14 is a solid diagram of the locking block of Embodiment 2.
Figure 15:
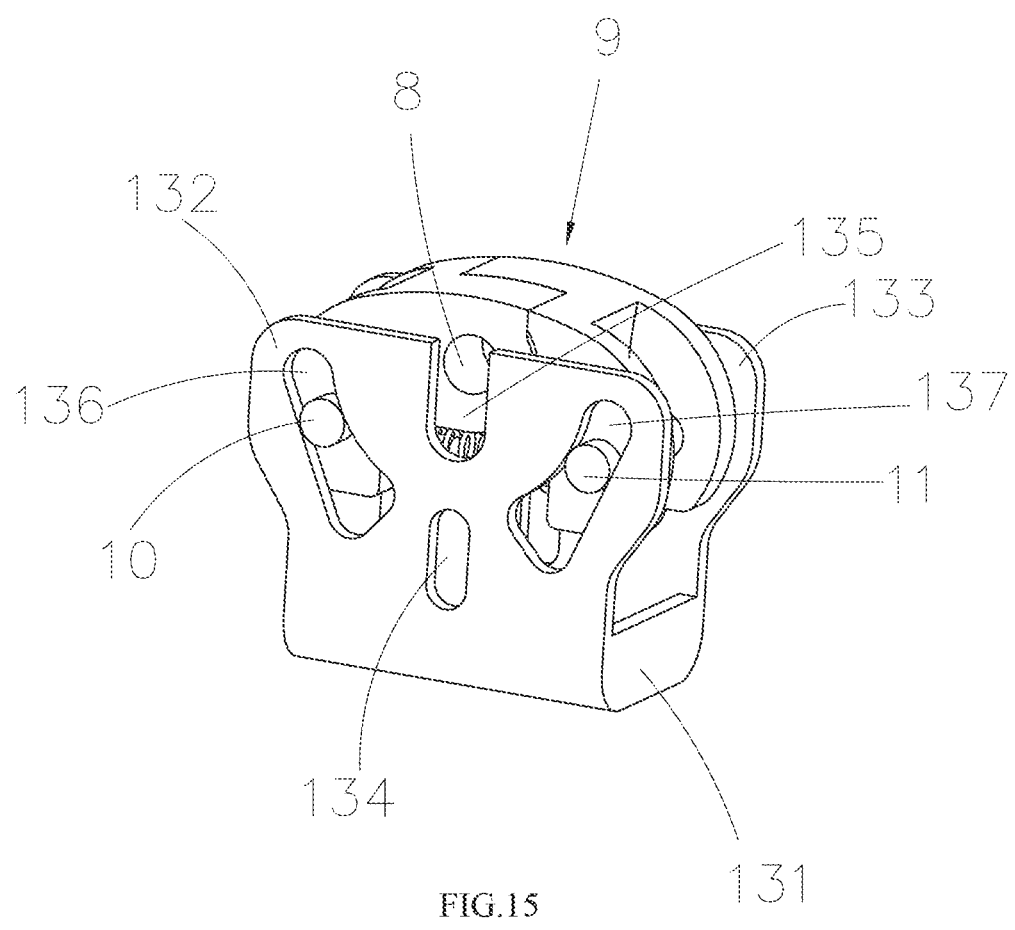
FIG. 15 is a solid diagram showing the matching of the locking block and the unlocking member of Embodiment 2.

The first unlocking portions 136 and the second unlocking portions 137 are sliding slots, and when operating the unlocking member 13, the outer side surfaces of the first unlocking portions 136 provide the force required to drive the first locking member 10 to rotate about the first rotation shaft 8, and the outer side surfaces of the second unlocking portions 137 provide the force required to drive the second locking member 11 to rotate about the first rotation shaft 8. The outer side surfaces are flat, and when the locking mechanism is in the locked state, an angle α1 between the connecting line L1 of the center of the first rotation shaft 8 and the center of the first locking member 10 and the extension line L2 of the outer side surface of the first unlocking portion 136 is greater than 90°, and an angle α2 between the connecting line L3 of the center of the first rotation shaft 8 and the center of the second locking member 11 and the extension line L4 of the outer side surface of the second unlocking portions 137 is greater than 90° (wherein, L1, L2, L3, L4, α1 and α2 refer to FIG. 13, although FIG. 13 shows the unlocked state, in this state, neither the first matching portion 61 nor the second matching portion 71 exerts any force on the locking block 9, that is, the state maintained by the locking block 9 is consistent with the locked state, therefore, in order to clearly show L1, L2, L3, L4, α1 and α2, they are marked on FIG. 13).

Inner side surfaces of the first unlocking portions 136 and the second unlocking portions 137 are arc surfaces, and when the locking block 9 is rotated around the first rotation shaft 8, the arc surfaces match the movement trajectories of the first locking member 10 and the second locking member 11, so as not to interfere with the rotation of the locking block 9.

Figure 16:
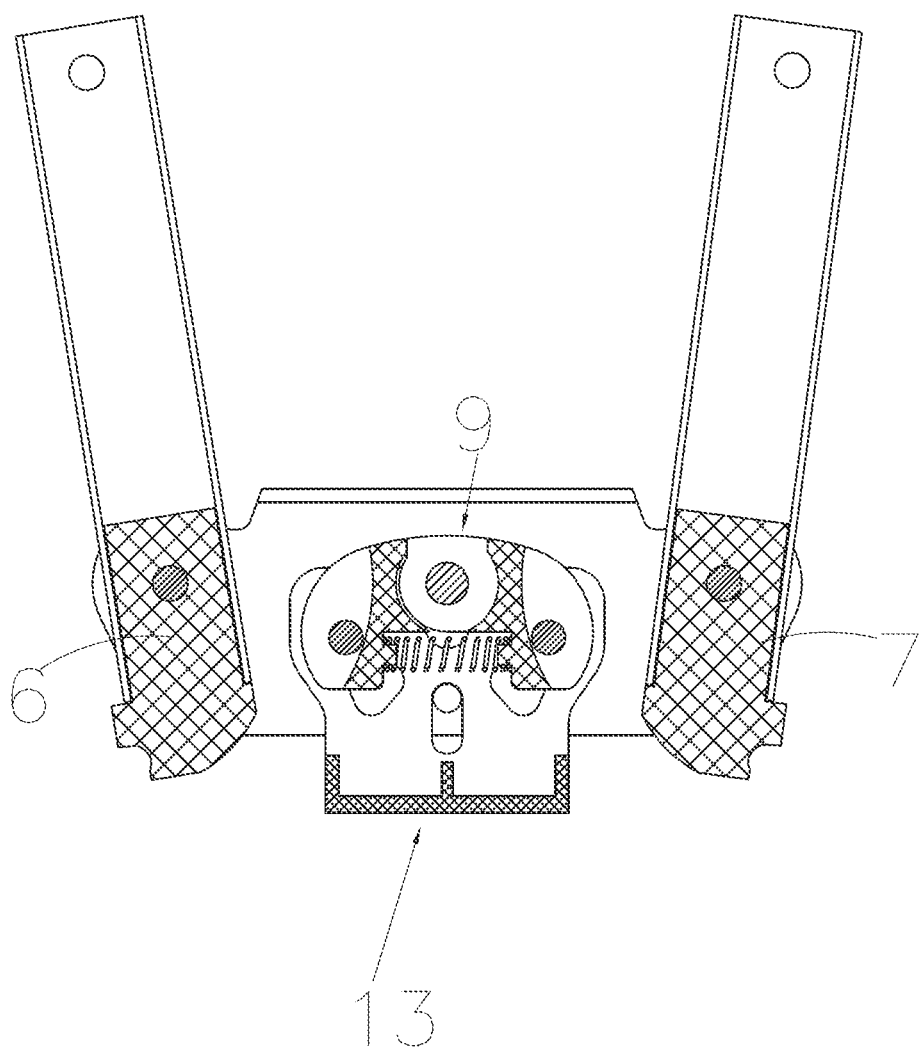
FIG. 16 is a sectional view of the locking mechanism of Embodiment 2 in the unlocked state.
Figure 17:
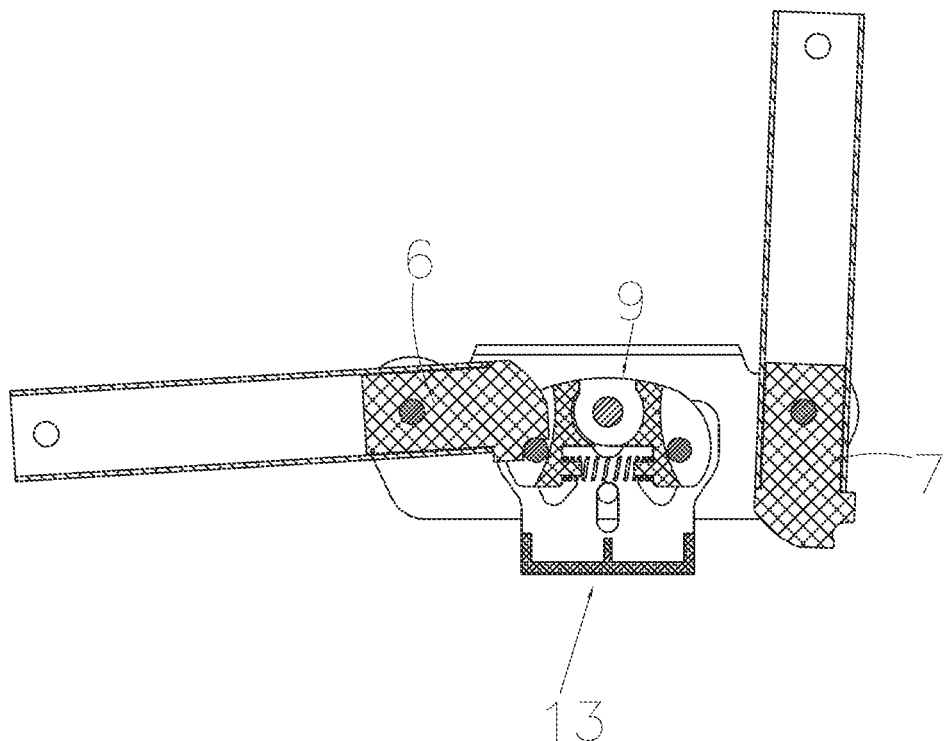
FIG. 17 is a sectional view of the locking mechanism of Embodiment 2 in a unilateral locked state.
Figure 18:
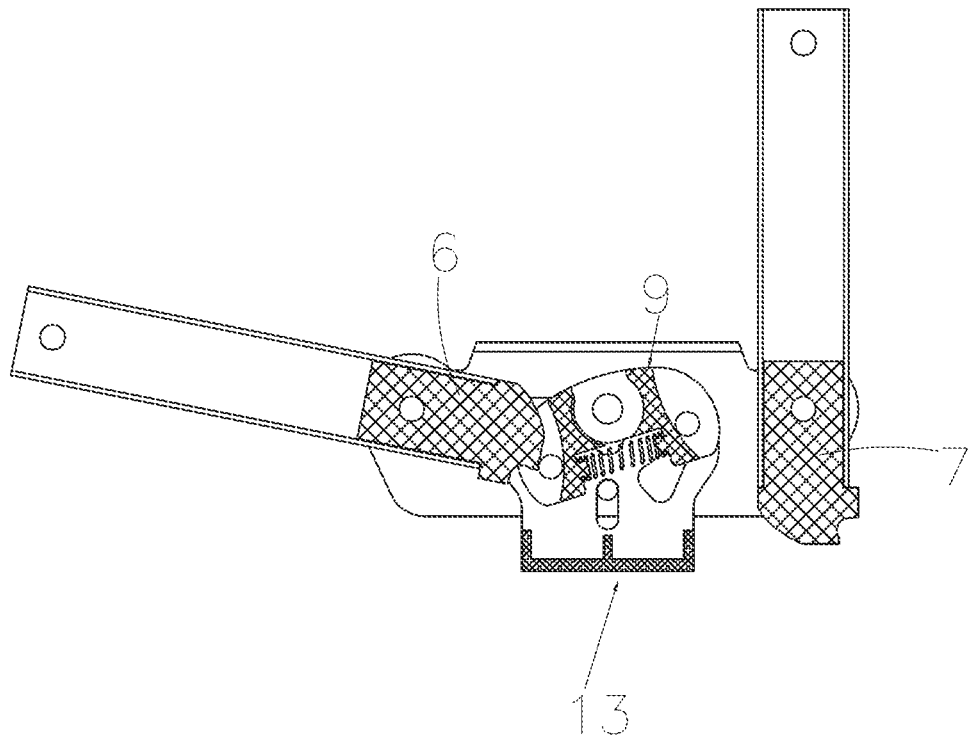
FIG. 18 is a sectional view of the swing of the locking block of Embodiment 2 when the locking mechanism is unilaterally locked.
Figure 19:
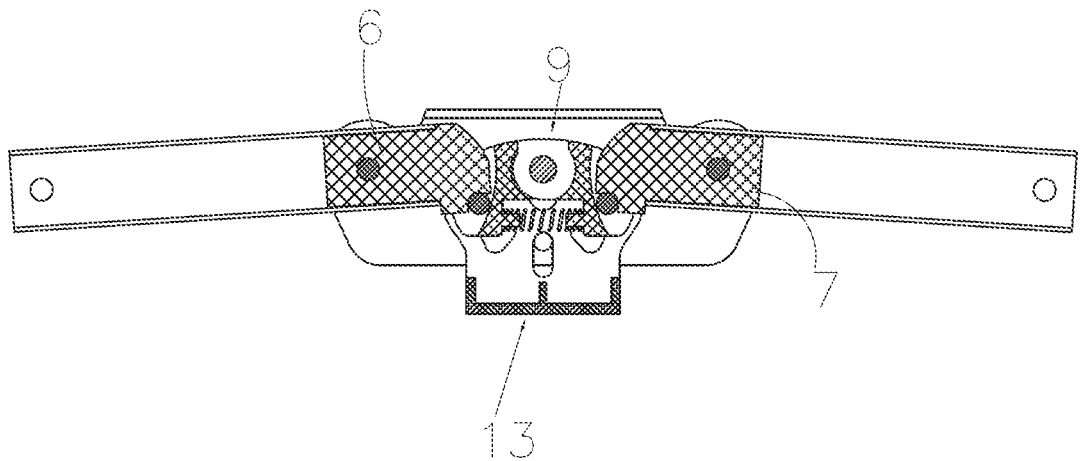
FIG. 19 is a sectional view of the locking mechanism of Embodiment 2 in the locked state.
Figure 20:
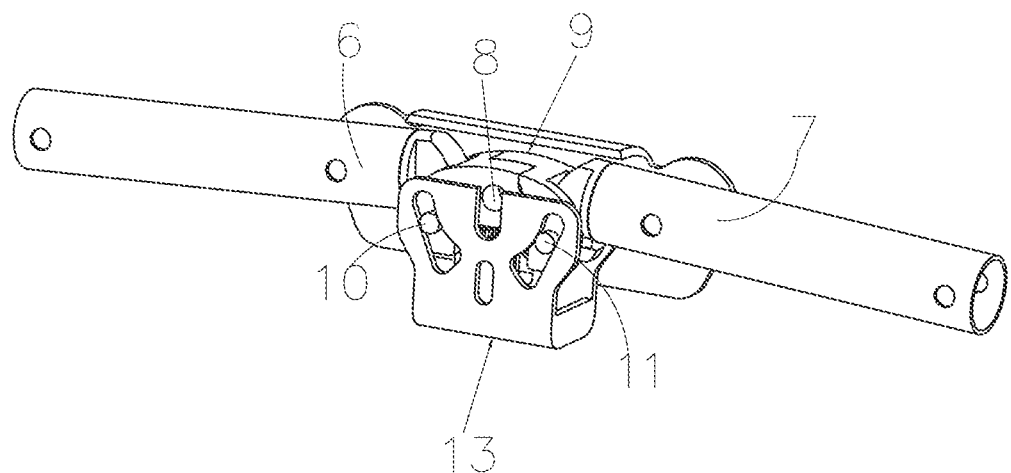
FIG. 20 is a solid diagram of the locking mechanism of Embodiment 2 in the locked state.
Figure 21:
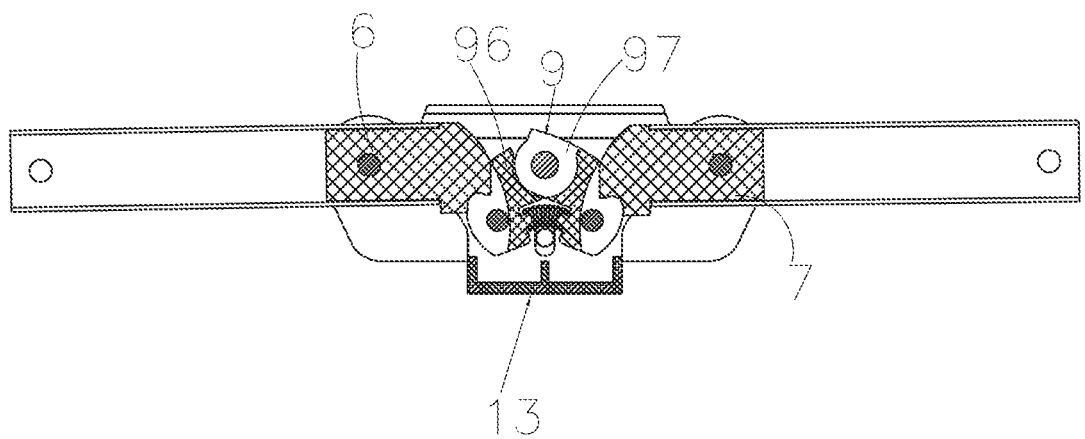
FIG. 21 is a sectional view showing the unlocking member controls the locking mechanism to unlock in Embodiment 2.
Figure 22:
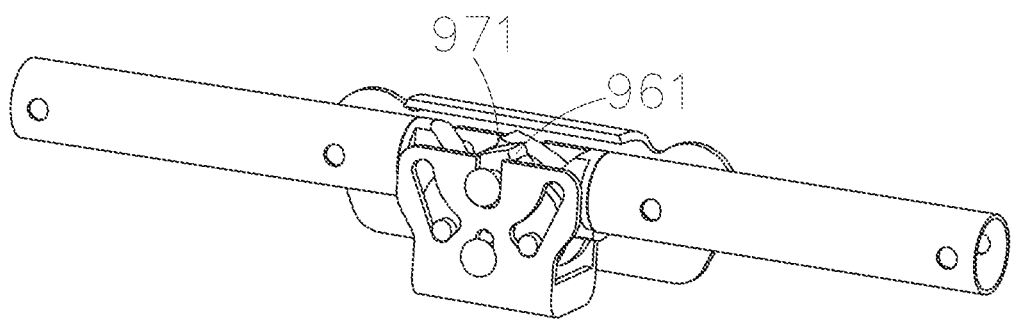
FIG. 22 is a solid diagram showing the unlocking member controls the locking mechanism to unlock in Embodiment 2.

When the locking mechanism is in the locked state, by squeezing the unlocking member 13 to slide it upward, inclined surfaces of the first unlocking portions 136 drive the first locking member 10, inclined surfaces of the second unlocking portions 137 drive the second locking member 11, and under the action of the first locking member 10 and the second locking member 11, the first part 96 and the second part 97 are respectively rotated around the first rotation shaft 8 and overcome the elastic force of the elastic element 12 to get close to each other, the first locking member 10 is separated from the first matching portion 61, and the second locking member 11 is separated from the second matching portion 71, at this moment, the elastic element 12 is compressed (as shown in FIG. 21 and FIG. 22). The first connection member 6 and the second connection member 7 can respectively rotate around the second rotation shaft 4 and the third rotation shaft 5, the first part 96 and the second part 97 move away from each other under the action of the elastic force of the elastic element 12, and drive the first locking member 10 and the second locking member 11 away from each other until the first end face 961 and the second end face 971 are against each other and cannot continue to move away, the movement of the first locking member 10 and the second locking member 11 and the self-gravity of the unlocking member 13 drive the unlocking member 13 to slide downward to the unlocked state, as shown in FIG. 16.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A locking mechanism, comprising:
   a locking body;
   a first connection member rotatably connected to one end of the locking body;
   a second connection member rotatably connected to another end of the locking body;
   a locking block rotatably connected to the locking body;
   a first locking member and a second locking member disposed on the locking block;
   a first matching portion that is formed on the first connection member and can match the first locking member, and a second matching portion that is formed on the second connection member and can match the second locking member;
   wherein, when the first matching portion matches the first locking member and the second matching portion matches the second locking member, the locking mechanism is in a locked state, and the locking block is fixed with respect to the locking body;
   wherein, when the first matching portion is separated from the first locking member and the second matching portion matches the second locking member, or the second matching portion is separated from the second locking member and the first matching portion matches the first locking member, or the first matching portion is separated from the first locking member and the second matching portion is separated from the second locking member, the locking mechanism is in an unlocked state, and the locking block can rotate with respect to the locking body;
   wherein the locking mechanism further comprises:
   an unlocking member configured to drive the locking mechanism to unlock, the unlocking member comprises an unlocking body slidably disposed on the locking body;
   a first unlocking portion disposed on the unlocking body and configured to drive the first locking member to separate from the first matching portion as the unlocking body slides; and
   a second unlocking portion disposed on the unlocking body and configured to drive the second locking member to separate from the second matching portion as the unlocking body slides.

2. The locking mechanism according to claim 1, wherein the locking block is rotatably connected to the locking body through a first rotating shaft.

3. The locking mechanism according to claim 1, further comprising a first sliding slot disposed on the locking block and a second sliding slot disposed on the locking block, the first locking member is slidably disposed within the first sliding slot, the second locking member is slidably disposed within the second sliding slot, and the locking mechanism further comprises an elastic element causing the first locking member and the second locking member to have a tendency to move to the locked state.

4. The locking mechanism according to claim 3, the first sliding slot and the second sliding slot extend in a left-right direction of the locking mechanism, respectively.

5. The locking mechanism according to claim 1, wherein the locking block further comprises a first part and a second part that are rotatably connected, the first locking member is fixedly or rotatably disposed on the first part, and the second locking member is fixedly or rotatably disposed on the second part; the locking mechanism further comprises an elastic element causing the first locking member and the second locking member to have a tendency to move to the locked state.

6. The locking mechanism according to claim 5, wherein the locking body, the first part and the second part are coaxially and rotatably connected.

7. The locking mechanism according to claim 5, wherein the first part has a first end face, and the second part has a second end face that can be disposed against the first end face.

8. The locking mechanism according to claim 1, wherein, the first unlocking portion and the second unlocking portion are respectively formed as sliding slots disposed on the unlocking body and extend obliquely.

9. The locking mechanism according to claim 1, wherein, the locking mechanism further comprises a first sliding slot disposed on the locking block and a second sliding slot disposed on the locking block, the first locking member is slidably disposed within the first sliding slot, the second locking member is slidably disposed within the second sliding slot, and when the locking mechanism is in the locked state, the first unlocking portion and the second unlocking portion are respectively arc-shaped slots with a point on the axial line of rotation of the locking block as a center of a circle.

10. The locking mechanism according to claim 1, wherein, the locking block further comprises a first part and a second part that are rotatably connected, the first locking member is fixedly or rotatably disposed on the first part, the second locking member is fixedly or rotatably disposed on the second part, the first unlocking portion has an outer side surface for providing force required to drive the first locking member to rotate about a first rotating shaft which rotatably connects the locking block to the locking body, and the second unlocking portion has an outer side surface for providing force required to drive the second locking member to rotate about the first rotating shaft.

11. The locking mechanism according to claim 10, wherein both the first unlocking portion and the second unlocking portion are provided with inclined surfaces that can push the first locking member and the second locking member toward a center.

12. The locking mechanism according to claim 10, wherein when the locking mechanism is in the locked state, an angle between a connecting line of a center of the first rotating shaft and a center of the first locking member and an extension line of the outer side surface of the first unlocking portion is greater than 90°, and an angle between a connecting line of the center of the first rotating shaft and a center of the second locking member and an extension line of the outer side surface of the second unlocking portion is greater than 90°.

13. The locking mechanism according to claim 10, wherein outer side surfaces are flat.

14. The locking mechanism according to claim 10, wherein inner side surfaces of the first unlocking portion and the second unlocking portion are arc surfaces, a radian of the arc surfaces is consistent with a radian of rotation of the first locking member and the second locking member around the first rotating shaft.

15. The locking mechanism according to claim 1, wherein the unlocking member further comprises a third sliding slot disposed on the unlocking body and extending in an up-down direction, a sliding rod fixedly disposed on the locking body and inserted in the third sliding slot, and a fourth sliding slot disposed on the unlocking body for avoiding a first rotating shaft connecting the locking block and the locking body.

16. The locking mechanism according to claim 1, wherein the unlocking body comprises a bottom first plate, and a front second plate and a rear third plate that are connected with the first plate, the locking block is located between the second plate and the third plate, and when the locking mechanism is in the locked state, the first plate is exposed outside the locking body.

17. A child's product, wherein the child's product comprises a locking mechanism according to claim 1.

* * * * *